US010260574B2

United States Patent
Yamamoto

(10) Patent No.: US 10,260,574 B2
(45) Date of Patent: Apr. 16, 2019

(54) SHIFT CONTROL DEVICE

(71) Applicant: SUBARU CORPORATION, Tokyo (JP)

(72) Inventor: Takahiro Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 26 days.

(21) Appl. No.: 15/593,431

(22) Filed: May 12, 2017

(65) Prior Publication Data
US 2018/0031058 A1 Feb. 1, 2018

(30) Foreign Application Priority Data

Jul. 28, 2016 (JP) ................................ 2016-149009

(51) Int. Cl.
*F16D 48/06* (2006.01)
*F16H 63/34* (2006.01)
(Continued)

(52) U.S. Cl.
CPC .......... *F16D 48/06* (2013.01); *B60W 10/182* (2013.01); *F16H 63/3425* (2013.01);
(Continued)

(58) Field of Classification Search
CPC .......... F16D 48/06; F16D 2500/10412; F16D 2500/1107; F16D 2500/3067;
(Continued)

(56) References Cited

U.S. PATENT DOCUMENTS

| 5,876,301 A * | 3/1999 | Tabata ................. B60W 10/06 477/106 |
| 6,277,049 B1 * | 8/2001 | Nishino ................. F16H 59/72 477/143 |

(Continued)

FOREIGN PATENT DOCUMENTS

| JP | 07-032915 A | 2/1995 |
| JP | 2002122236 A | 4/2002 |

(Continued)

OTHER PUBLICATIONS

Decision to Grant a Patent for JP Patent Application No. 2016-149009, dated Mar. 6 2018, 03 pages of Office Action and 03 pages of English Translation.

*Primary Examiner* — Huan Le
(74) *Attorney, Agent, or Firm* — Chip Law Group

(57) ABSTRACT

A shift control device includes: a selector configured to receive operation of selecting a shift range of an automatic transmission and output selection information corresponding to the operation, the automatic transmission being configured to convert and output driving force of an engine; a range switch controller configured to switch the shift range in accordance with the selection information; a parking mechanism configured to bring the automatic transmission into a parking state by locking rotation of the automatic transmission; a clutch configured to turn on/off transmission of driving force; a clutch controller configured to control operation of the clutch in accordance with the selection information; and a delay setter configured to set delay time until driving of the parking pawl starts on the basis of rotation speed difference and oil temperature of the automatic transmission when selection information indicating that the parking range is selected is output.

16 Claims, 5 Drawing Sheets

(51) Int. Cl.
*B60W 10/18* (2012.01)
*F16H 59/46* (2006.01)
*F16H 59/54* (2006.01)
*F16H 59/56* (2006.01)
*F16H 59/72* (2006.01)
*F16H 59/14* (2006.01)

(52) U.S. Cl.
CPC ..... *F16H 63/3458* (2013.01); *F16H 63/3466* (2013.01); *F16D 2500/10412* (2013.01); *F16D 2500/1107* (2013.01); *F16D 2500/3067* (2013.01); *F16D 2500/30803* (2013.01); *F16D 2500/3166* (2013.01); *F16D 2500/31466* (2013.01); *F16H 59/46* (2013.01); *F16H 59/54* (2013.01); *F16H 59/56* (2013.01); *F16H 59/72* (2013.01); *F16H 2059/147* (2013.01)

(58) Field of Classification Search
CPC . F16D 2500/30803; F16D 2500/31466; F16D 2500/3166; F16H 63/3425; F16H 63/3458; F16H 63/3466; F16H 59/46; F16H 59/56; F16H 59/72; F16H 2059/147

See application file for complete search history.

(56) References Cited

U.S. PATENT DOCUMENTS

2010/0095796 A1* 4/2010 Nakamura .......... F16H 61/0437
74/473.33
2010/0168954 A1* 7/2010 Inoue .................... F16H 59/72
701/31.4

FOREIGN PATENT DOCUMENTS

JP 2007-314146 A 12/2007
JP 2010-096281 A 4/2010
JP 2011-122670 A 6/2011

* cited by examiner

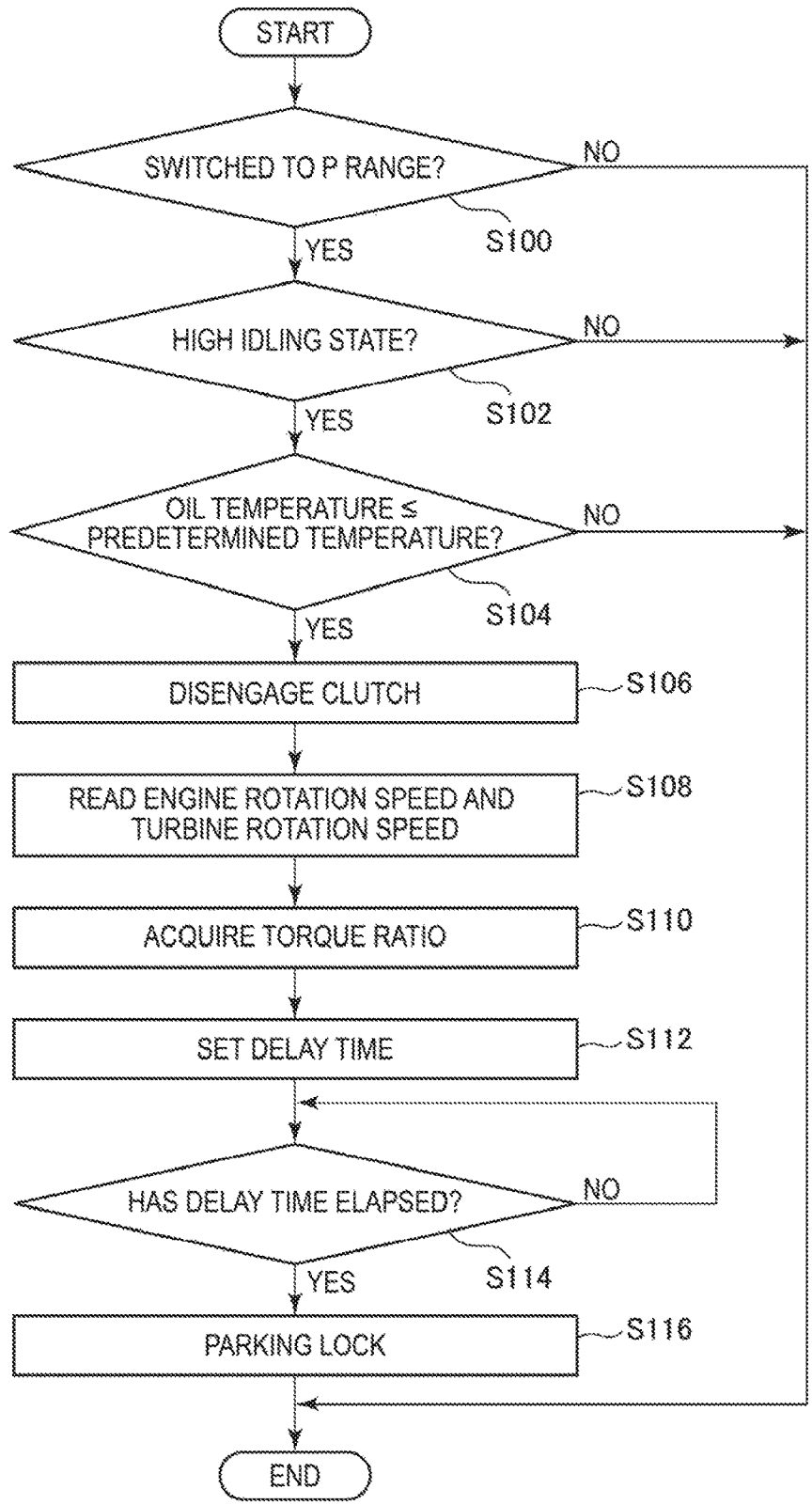

SHIFT CONTROL DEVICE

CROSS-REFERENCE TO RELATED APPLICATIONS

The present application claims priority from Japanese Patent Application No. 2016-149009 filed on Jul. 28, 2016, the entire contents of which are hereby incorporated by reference.

BACKGROUND

1. Technical Field

The present invention relates to a shift control device, and more particularly, to a shift control device of an automatic transmission having a parking mechanism for locking an output shaft.

2. Related Art

Generally, a driving force output from an engine is input to an automatic transmission via a torque converter, is converted by the automatic transmission, and then transmitted to a driving wheel via a power transmission system that includes a gear or a drive shaft. Therefore, for instance, in a state in which a shift position is in a D range (forward running position) or an R range (reverse running position), a brake pedal is depressed, and a vehicle is stopped, the drive shaft or the like constituting the power transmission system is twisted due to an engine torque input via the torque converter.

On the other hand, in an automatic transmission, when a P range (parking position) is selected, a parking gear fitted to the output shaft of the automatic transmission is locked (that is, the output shaft is fixed). Therefore, when the parking gear is locked in the state in which the drive shaft or the like constituting the power transmission system is twisted as described above, the twisted state of the drive shaft or the like constituting the power transmission system is maintained. Then, when shifting occurs from the P range to another range (for instance, the D range, or the like), by rotation of the parking gear, the drive shaft, or the like due to an accumulated torsional torque when the parking gear is unlocked and the maintained twist is eliminated, shock, vibration, or abnormal noise may be generated and cause a passenger to feel uncomfortable.

To solve the above problem, in Japanese Unexamined Patent Application Publication (JP-A) No. 2002-122236, a shift control device that prevents a torsional torque from remaining and prevents shock, abnormal noise, and the like when shifting from a P position to another position occurs is disclosed. More specifically, in the shift control device, when a shift lever is operated from an R position to the P position, a second clutch and a fourth brake in the automatic transmission are operated to a disengagement side, and after waiting for a predetermined time, the output shaft of the automatic transmission is locked by a parking lock mechanism. According to the shift control device, because the power transmission of the automatic transmission is disconnected prior to locking the output shaft, the output shaft is locked in a state in which there is no residual torsional torque in the power transmission system in the automatic transmission, and after that, shock is not generated even when shifting occurs from the P position to another position.

As described above, according to the technology described in JP-A No. 2002-122236, it is possible to prevent shock or abnormal noise accompanying release of torsional torque which is accumulated as torsional deformation. However, when the P range is selected and the parking gear fitted to the output shaft of the automatic transmission is locked in a state in which the drive shaft or the like constituting the power transmission system is twisted, for instance, until a clutch is disengaged and the parking gear and a parking pawl are fitted, the twist of the drive shaft or the like constituting the power transmission system is disengaged, the parking gear is rotated, and a rattling noise (abnormal noise) is generated due to the parking gear and the parking pawl coming into contact with each other in some cases.

However, in the shift control device described in JP-A No. 2002-122236, the rattling noise (abnormal noise) when the parking gear is locked is not considered as a problem. However, although the rattling noise (abnormal noise) is not considered as a problem, in the shift control device, when the shift lever is operated from the R position to the P position, the second clutch and the fourth brake in the automatic transmission are operated to the disengagement side, and after waiting for a predetermined time, the output shaft of the automatic transmission is locked by the parking lock mechanism. Thus, it is presumed that this can contribute to reduction of the rattling noise (abnormal noise) when the parking gear is locked.

The magnitude of the torsional torque (i.e., amount of twist) acting on the drive shaft or the like constituting the power transmission system varies depending on an operating state of a drive system (e.g., an operating state of an engine, etc.) when the parking gear is locked. Therefore, for instance, when the magnitude of the torsional torque (amount of twist) is large, depending on the length of the waiting time, there is a possibility that the rattling noise (abnormal noise) cannot be sufficiently reduced when the parking gear is locked. On the other hand, when the magnitude of the torsional torque (amount of twist) is small, the waiting time may be longer than necessary.

SUMMARY OF THE INVENTION

It is desirable to provide a shift control device of an automatic transmission having a parking mechanism for locking an output shaft, in which the shift control device is capable of reliably reducing a rattling noise (abnormal noise) between a parking gear and a parking pawl when the parking gear is locked regardless of an operating state of a drive system when a parking range is selected.

A shift control device according to an aspect of the present invention includes: a selector configured to receive an operation of selecting a shift range of an automatic transmission and output selection information corresponding to the operation, the automatic transmission being configured to convert and output a driving force of an engine input via a torque converter; a range switch controller configured to switch the shift range of the automatic transmission in accordance with the selection information output by the selector; a parking mechanism that includes a parking gear and a parking pawl, and that is configured to bring the automatic transmission into a parking state by locking rotation of the automatic transmission through engagement of the parking pawl with the parking gear; a clutch disposed between the torque converter and the parking mechanism and configured to turn on/off transmission of a driving force; a clutch controller configured to control operation of the clutch in accordance with the selection information output by the selector; and a delay setter configured to set a delay time until driving of the parking pawl starts on the basis of a rotation speed difference between a rotation speed of the engine and a rotation speed of a turbine of the torque converter and an oil temperature of the automatic transmission when selection information indicating that the parking range is selected is output. The clutch controller disengages the clutch when the selection information indicating that the parking range is selected is output. When the selection information indicating that the parking range is selected is output, the range switch controller drives the parking pawl and brings the automatic transmission into the parking state when the delay time set by the delay setter has elapsed after the clutch is disengaged by the clutch controller.

The delay setter may obtain a torque ratio from the rotation speed difference between the rotation speed of the engine and the rotation speed of the turbine of the torque converter and the oil temperature of the automatic transmission, and set the delay time in accordance with the torque ratio.

The delay setter may set the delay time on the basis of the rotation speed difference and the oil temperature at a time of high idling and/or stalling.

The delay setter may set the delay time on the basis of the rotation speed difference and the oil temperature when the oil temperature of the automatic transmission is a predetermined temperature or lower, and the delay setter may set the delay time to zero when the oil temperature is higher than the predetermined temperature.

The clutch may be disposed between the torque converter and the parking mechanism and may be a forward clutch or a reverse brake constituting a forward-reverse switching mechanism configured to switch a normal rotation and a reverse rotation of a driving wheel.

BRIEF DESCRIPTION OF THE DRAWINGS

FIG. 5 is a flowchart illustrating a processing order of a parking lock process (rattling noise reduction control) by the shift control device according to the example.

DETAILED DESCRIPTION

Figure 1:
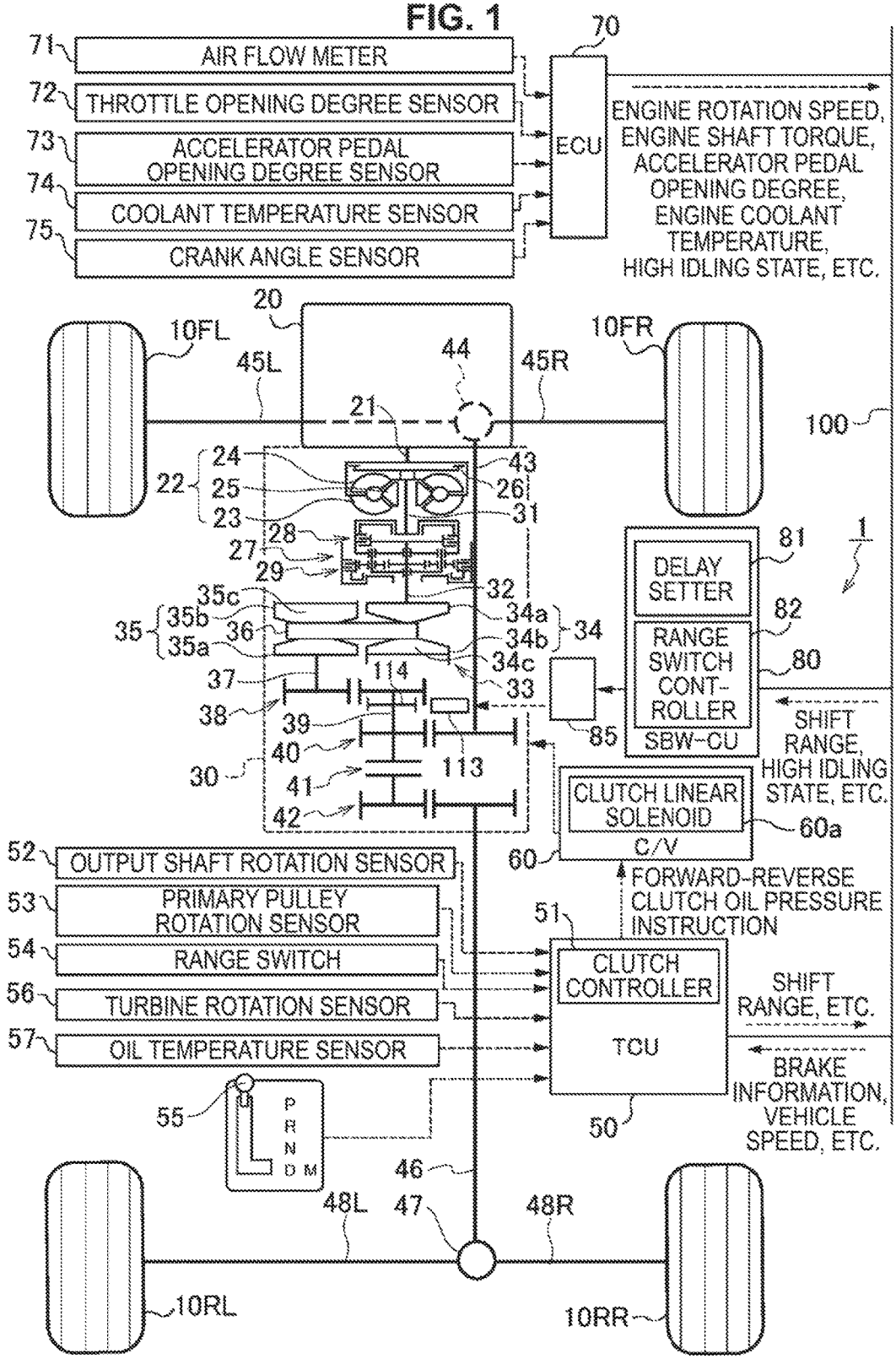
FIG. 1 is a block diagram illustrating configurations of a shift control device according to an example and a power train and a driving force transmission system of an all-wheel drive (AWD) vehicle equipped with the shift control device.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

Figure 2:
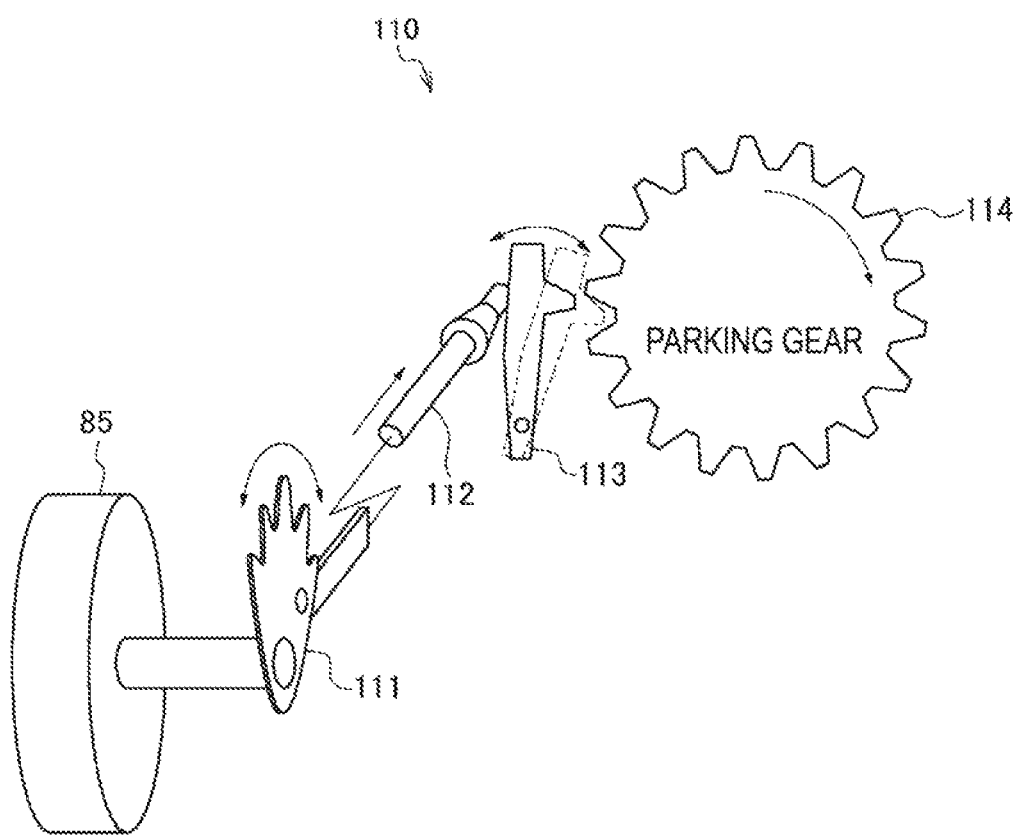
FIG. 2 is a view illustrating a configuration of a parking mechanism of a continuously variable transmission (CVT)

First, a configuration of a shift control device 1 according to an example will be described using FIGS. 1 and 2. FIG. 1 is a block diagram illustrating configurations of the shift control device 1 and a power train and a driving force transmission system of an all-wheel drive (AWD) vehicle equipped with the shift control device 1. Also, FIG. 2 is a view illustrating a configuration of a parking mechanism 110 of a continuously variable transmission (CVT) 30. Also, in the present example, a front engine front drive (FF)-based part-time AWD vehicle equipped with a shift-by-wire (SBW) CVT 30 will be described as an example.

An engine 20 may be of any type. For instance, the engine 20 is a horizontally opposed in-cylinder injection type four-cylinder gasoline engine. In the engine 20, air suctioned from an air cleaner (not illustrated) is throttled by an electronically controlled throttle valve (hereinafter also simply referred to as "throttle valve") provided in an air intake pipe, passes through an intake manifold, and is suctioned into each of the cylinders formed in the engine 20. Here, the amount of air suctioned from the air cleaner is detected by an air flow meter 71. Also, the throttle valve includes a throttle opening degree sensor 72 configured to detect an opening degree of the throttle valve. An injector configured to inject fuel is attached to each of the cylinders. Also, an ignition plug configured to ignite an air-fuel mixture and an igniter built-in coil configured to apply a high voltage to the ignition plug are attached to each of the cylinders. In each of the cylinders of the engine 20, an air-fuel mixture of the suctioned air and the fuel injected by the injector is ignited by the ignition plug and combusted. An exhaust gas after the combustion is discharged through an air exhaust pipe.

In addition to the air flow meter 71 and the throttle opening degree sensor 72 described above, a cam angle sensor configured to distinguish cylinders of the engine 20 is attached near a cam shaft of the engine 20. Also, a crank angle sensor 75 configured to detect a position of a crankshaft is attached in the vicinity of a crankshaft of the engine 20. The sensors are coupled to an engine control unit (hereinafter referred to as "ECU") 70 that will be described below. Also, various sensors such as an accelerator pedal opening degree sensor 73 configured to detect a depression amount of an accelerator pedal, i.e., an opening degree of the accelerator pedal, and a coolant temperature sensor 74 configured to detect a temperature of a coolant of the engine 20 are coupled to the ECU 70.

The CVT 30 configured to convert and output a driving force from the engine 20 is coupled to an output shaft (crankshaft) 21 via a torque converter 22 having a clutch function and a torque amplifying function and a forward-reverse switching mechanism 27. In one example, the CVT 30 may correspond to an "automatic transmission".

The torque converter 22 mainly includes a pump impeller 23, a turbine runner 24, and a stator 25. The pump impeller 23 coupled to the output shaft 21 generates flow of oil, and the turbine runner 24 disposed opposite to the pump impeller 23 receives power of the engine 20 through the oil and drives the output shaft. The stator 25 disposed between the two generates a torque amplifying action by rectifying a discharge flow (return) from the turbine runner 24 and reducing the discharge flow (return) to the pump impeller 23.

Also, the torque converter 22 includes a lockup clutch 26 configured to bring an input and an output into a directly coupled state. The torque converter 22 amplifies torque of the driving force of the engine 20 and transmits the torque to the CVT 30 when the lockup clutch 26 is not engaged (is in a non-lockup state) and directly transmits the driving force of the engine 20 to the CVT 30 when the lockup clutch 26 is engaged (in a lockup state). A rotation speed of the turbine runner 24 (a turbine rotation speed) constituting the torque converter 22 is detected by a turbine rotation sensor 56. The detected turbine rotation speed is output to a transmission control unit (hereinafter referred to as "TCU") 50 that will be described below.

The forward-reverse switching mechanism 27 switches between normal rotation and reverse rotation of driving wheels 10 (a front left wheel 10FL, a front right wheel 10FR, a rear left wheel 10 RL, and a rear right wheel 10RR) (forward movement and reverse movement of the vehicle).

The forward-reverse switching mechanism 27 mainly includes a double pinion type planetary gear train, a forward clutch 28, and a reverse brake 29. In one example, the reverse brake 29 may correspond to a "clutch". The forward-reverse switching mechanism 27 is configured so that a transmission path of a driving force of the engine can be switched by controlling a state of each of the forward clutch 28 and the reverse brake 29.

More specifically, when a drive (D) range is selected, by engaging the forward clutch 28 and disengaging the reverse brake 29, rotation of a turbine shaft 31 is directly transmitted to a primary shaft 32 that will be described below, and it is possible to make the vehicle run forward. On the other hand, when a reverse (R) range is selected, by disengaging the forward clutch 28 and engaging the reverse brake 29, a rotating direction of the primary shaft 32 may be reversed by operating the planetary gear train, and it is possible to make the vehicle run backward.

Also, when a neutral (N) range or a parking (P) range is selected, by disengaging the forward clutch 28 and the reverse brake 29, the turbine shaft 31 and the primary shaft 32 are detached (transmission of the driving force of the engine is blocked), and the forward-reverse switching mechanism 27 enters a neutral state in which power is not transmitted to the primary shaft 32. Also, operations of the forward clutch 28 and the reverse brake 29 are controlled by the TCU 50 and a valve body (control valve) 60.

A gear shift mechanism (variator) 33 of the CVT 30 includes the primary shaft 32 coupled to the turbine shaft (output shaft) 31 of the torque converter 22 via the forward-reverse switching mechanism 27 and a secondary shaft 37 disposed in parallel with the primary shaft 32. The primary shaft 32 includes a primary pulley 34. The primary pulley 34 includes a fixed pulley 34a coupled to the primary shaft 32 and a movable pulley 34b disposed opposite to the fixed pulley 34a and slidably mounted in an axial direction of the primary shaft 32, and is configured so that an interval between cone faces of the pulleys 34a and 34b, i.e., a pulley groove width, can be changed. On the other hand, the secondary shaft 37 includes a secondary pulley 35. The secondary pulley 35 includes a fixed pulley 35a coupled to the secondary shaft 37 and a movable pulley 35b disposed opposite to the fixed pulley 35a and mounted to be slidable in an axial direction of the secondary shaft 37, and is configured so that a pulley groove width can be changed.

A chain 36 configured to transmit a driving force is stretched between the primary pulley 34 and the secondary pulley 35. By changing groove widths of the primary pulley 34 and the secondary pulley 35 to change a ratio of winding diameters of the chain 36 around the pulleys 34 and 35 (pulley ratio), a gear ratio is steplessly changed.

Here, a hydraulic chamber 34c is formed in the primary pulley 34 (the movable pulley 34b). On the other hand, a hydraulic chamber 35c is formed in the secondary pulley 35 (the movable pulley 35b). The groove widths of the primary pulley 34 and the secondary pulley 35 are respectively set and changed by adjusting a primary hydraulic pressure introduced into the hydraulic chamber 34c of the primary pulley 34 and a secondary hydraulic pressure introduced into the hydraulic chamber 35c of the secondary pulley 35.

The secondary shaft 37 of the gear shift mechanism 33 is coupled to a counter shaft 39 via a reduction gear 38 formed of a pair of gears (a reduction drive gear, a reduction driven gear), and the driving force converted by the gear shift mechanism 33 is transmitted to the counter shaft 39 via the reduction gear 38. A parking gear 114 is attached to the counter shaft 39.

Here, the parking mechanism 110 of the CVT 30 will be described with reference to FIG. 2. The parking mechanism 110 is a mechanism configured to lock rotation inside the CVT so that the wheels 10 do not rotate when the P range is selected. A detent plate 111 is attached to an output shaft of an SBW actuator 85 (e.g., an electric motor) driven by an SBW control unit (hereinafter referred to as an "SBW-CU") 80 that will be described below. A parking rod 112 is coupled to the detent plate 111 to be able to advance and retreat in the axial direction. On the other hand, as described above, the parking gear 114 is spline-fitted to the counter shaft 39 of the CVT 30. Also, a parking pawl 113 is swingably disposed to be engaged with the parking gear 114.

When the P range is selected, the detent plate 111 swings due to rotation of the SBW actuator 85 (electrical motor), and the parking rod 112 advances in the axial direction. The parking pawl 113 is pushed from a rear surface by a tapered portion of the parking rod 112 and swings, and is engaged with the parking gear 114. In this way, rotation of the CVT 30 is locked.

Returning to FIG. 1, the counter shaft 39 is coupled to a front drive shaft 43 via a counter gear 40 formed of a pair of gears (a counter drive gear and a counter driven gear). The driving force transmitted to the counter shaft 39 is transmitted to a front differential (hereinafter, also referred to as "front diff") 44 via the counter gear 40 and the front drive shaft 43. The front diff 44 is, for instance, a bevel gear type differential device. The driving force from the front diff 44 is transmitted to the front left wheel 10FL via a front left wheel drive shaft 45L and is also transmitted to the front right wheel 10FR via a front right wheel drive shaft 45R.

On the other hand, a transfer clutch 41 configured to adjust a driving force transmitted to a rear differential 50 is interposed in a rear stage of the counter gear 40 (the counter drive gear) on the counter shaft 39 described above. In the transfer clutch 41, an engaging force (i.e., a torque distribution ratio to the rear wheels 10RL and 10RR) is controlled in accordance with a driving state of four wheels (e.g., a slipping condition of the front wheels 10FL and 10FR), an engine torque, and the like. Therefore, the driving force transmitted to the counter shaft 39 is distributed according to the engaging force of the transfer clutch 41 and is also transmitted to the rear wheels 10RL and 10RR.

More specifically, a rear end of the counter shaft 39 is coupled to a propeller shaft 46 extending toward the rear of the vehicle via a transfer gear 42 formed of a pair of gears (a transfer drive gear and a transfer driven gear). Therefore, the driving force transmitted to the counter shaft 39 and adjusted (distributed) by the transfer clutch 41 is transmitted from the transfer gear 42 (the transfer driven gear) to a rear differential 47 via the propeller shaft 46.

A rear left wheel drive shaft 48L and a rear right wheel drive shaft 48R are coupled to the rear differential 47. A driving force from the rear differential 47 is transmitted to the rear left wheel 10RL via the rear left wheel drive shaft 48L and is also transmitted to the rear right wheel 10RR via the rear right wheel drive shaft 48R.

A shift lever 55 configured to receive a shift operation from a driver is disposed on a floor (a center console) of the vehicle. A range switch 54 coupled to move by interlocking with the shift lever 55 and configured to detect a selected position of the shift lever 55 is attached to the shift lever 55. The range switch 54 is coupled to the TCU 50, and the detected selected position of the shift lever 55 is read into the TCU 50. That is, according to the example of the present invention, the shift lever 55 and the range switch 54 serve as a "selector". Also, the shift lever 55 may selectively switch among five shift ranges, i.e., the P range, a reverse running range (R range), the N range, a forward running range (D range), and a manual range (M range).

With such a configuration of the driving force transmission system of the power train described above, for instance, when the shift lever 55 is operated to the D range, the forward clutch 28 is engaged and the driving force of the engine is input to the primary shaft 32 of the CVT 30. The driving force converted by the CVT 30 is output from the secondary shaft 37 and is transmitted to the front drive shaft 43 via the reduction gear 38, the counter shaft 39, and the counter gear 40. Also, the driving force is distributed to the left and the right by the front differential 44 and transmitted to the left and right front wheels 10FL and 10FR. Therefore, the left and right front wheels 10FL and 10FR are constantly driven when a vehicle 4 is running.

On the other hand, a portion of the driving force transmitted to the counter shaft 39 is transmitted to the propeller shaft 46 via the transfer clutch 41 and the transfer gear 42. Here, when a predetermined clutch torque is applied to the transfer clutch 41, the distributed driving force is output to the propeller shaft 46 according to the clutch torque. Then, the driving force is also transmitted to the rear wheels 10RL and 10RR via the rear differential 47. In this way, a function as the FF-based part-time AWD vehicle is demonstrated.

Hydraulic pressures for shifting the CVT 30, i.e., the primary hydraulic pressure and the secondary hydraulic pressure, are controlled by the valve body (control valve) 60. The valve body 60 opens and closes an oil passage formed in the valve body 60 using a spool valve and a solenoid valve (electronic valve) configured to move the spool valve, adjusts a hydraulic pressure discharged from an oil pump, and supplies the hydraulic pressure to the hydraulic chamber 34c of the primary pulley 34 and the hydraulic chamber 35c of the secondary pulley 35. Likewise, the valve body 60 opens and closes an oil passage formed in the valve body 60 using the spool valve and the solenoid valve configured to move the spool valve, adjusts a hydraulic pressure discharged from the oil pump, and supplies a hydraulic pressure for engaging/disengaging the forward clutch 28, the reverse brake 29, and the transfer clutch 41 to each of the clutches.

The shift control of the CVT 30 is executed by the TCU 50. That is, by controlling driving of the solenoid valve (electronic valve) constituting the valve body 60 described above, the TCU 50 adjusts the hydraulic pressure supplied to the hydraulic chamber 34c of the primary pulley 34 and the hydraulic chamber 35c of the secondary pulley 35 and changes the gear ratio of the CVT 30. Likewise, by controlling driving of the solenoid valve constituting the valve body 60 described above, the TCU 50 adjusts the hydraulic pressure supplied to the transfer clutch 41 and adjusts a distribution ratio of the driving force transmitted to the rear wheels 10RL and 10RR.

Also, by controlling driving of a clutch linear solenoid 60a constituting the valve body 60, the TCU 50 adjusts the hydraulic pressure being supplied to the forward clutch 28 or the reverse brake 29 and engages/disengages the forward clutch 28 or the reverse brake 29. Whether to supply the hydraulic pressure (oil) adjusted by the clutch linear solenoid 60a to the forward clutch 28 or the reverse brake 29 is switched by a manual valve (not illustrated) configured to operate by interlocking with the detent plate 111.

Here, the TCU 50 is coupled to the ECU 70 configured to comprehensively control the engine 20 and the SBW-CU 80 via a controller area network (CAN) 100 to communicate with each other.

In the ECU 70, a cylinder is distinguished from an output of the cam angle sensor, and an engine rotation speed is obtained from a change of the rotational position of the crankshaft detected by the output of the crank angle sensor 75. The ECU 70 also acquires various information such as an intake air amount, an opening degree of the accelerator pedal, an air-fuel ratio of the air-fuel mixture, and coolant temperature on the basis of detected signals input from the above-described various sensors. Then, the ECU 70 comprehensively controls the engine 20 by controlling a fuel injection amount, an ignition timing, and various devices such as a throttle valve on the basis of the various information that is acquired.

Further, in the ECU 70, an engine shaft torque (output torque) of the engine 20 is calculated on the basis of an intake air amount detected by the air flow meter 71. Also, the ECU 70 transmits information such as an engine coolant temperature (coolant temperature), the engine shaft torque, the engine rotation speed, and the opening degree of the accelerator pedal via the CAN 100. Also, when an idle rotation speed is controlled to be higher than normal (after warming up) (for instance, one thousand and several hundreds of revolutions) while the engine is warming up, the ECU 70 transmits information indicating that the engine is in the high idle state (e.g., a flag).

An output shaft rotation sensor (vehicle speed sensor) 52 attached near the output shaft (the secondary shaft 37) of the CVT 30 and configured to detect a rotation speed of the output shaft and a primary pulley rotation sensor 53 configured to detect the rotation speed of the primary pulley 34 are coupled to the TCU 50. Also, the range switch 54 configured to detect the selected position of the shift lever 55 is coupled to the TCU 50. Further, the turbine rotation sensor 56 described above and an oil temperature sensor 57 configured to detect an oil temperature of the CVT 30 are coupled to the TCU 50.

The TCU 50 includes a microprocessor configured to perform arithmetic operations, a read-only memory (ROM) configured to store a program or various maps for the microprocessor to execute each process, a random access memory (RAM) configured to store various data such as an arithmetic operation result, a backup RAM configured to maintain the stored content with a 12 V battery, and an input-output interface (I/F).

According to a shift map, the TCU 50 automatically steplessly shifts the gear ratio according to a driving state (e.g., an accelerator pedal opening degree, a vehicle speed, or an engine rotation speed) of the vehicle. The shift map is stored in the ROM in the TCU 50.

The TCU 50 executes transfer clutch control (AWD control) on the basis of the various information acquired from the above-described various sensors. Also, the TCU 50 controls the hydraulic pressure of the forward clutch 28 or the reverse brake 29 constituting the forward-reverse switching mechanism 27 by cooperating with the SBW-CU 80 so that a rattling noise (abnormal noise) between the parking gear 114 and the parking pawl 113 is reduced at the time of parking lock. Therefore, the TCU 50 functionally includes a clutch controller 51. The TCU 50 realizes a function of the clutch controller 51 by executing a program stored in the ROM by the microprocessor.

The clutch controller 51 controls operation (engagement/disengagement) of the forward clutch 28 or the reverse brake 29 according to the selection information of the shift lever 55. That is, according to the example of the present invention, the clutch controller 51 serves as a "clutch controller". Particularly, when switching occurs from the D range to the P range or from the R range to the P range, i.e., when the selection information indicating that the P range is selected is output, the clutch controller 51 immediately drives the clutch linear solenoid 60a, decreases the hydraulic pressure supplied to the forward clutch 28 or the reverse brake 29, and disengages the clutch. In this way, twist of a drive shaft (e.g., the turbine shaft 31, the primary shaft 32, the secondary shaft 37, the counter shaft 39, the front drive shaft 43, the front left wheel drive shaft 45L, the front right wheel drive shaft 45R, the propeller shaft 46, the rear left wheel drive shaft 48L, the rear right wheel drive shaft, etc.) constituting the power transmission system is released.

The SBW-CU 80 generates and outputs a control signal (motor driving signal) on the basis of the various information including the shift range received from the TCU 50 via the CAN 100 and drives the SBW actuator 85. Also, the SBW-CU 80 receives information (flag) indicating the high idle state or information such as brake information (brake operation information) via the CAN 100.

The SBW actuator 85 operates the manual valve (not illustrated) configured to interlock with the detent plate 111 according to the control signal from the SBW-CU 80 and switches the sift range of the CVT 30. That is, according to the example of the present invention, the SBW-CU 80 and the SBW actuator 85 serve as a "range switch controller".

The SBW-CU 80 drives the parking pawl 113 so that the rattling noise (abnormal noise) between the parking gear 114 and the parking pawl 113 is reduced when the P range is selected (at the time of parking lock). Therefore, the SBW-CU 80 functionally includes a delay setter 81 and a range switch controller 82. The SBW-CU 80 realizes functions of the delay setter 81 and the range switch controller 82 by executing a program stored in a ROM by a microprocessor.

The delay setter 81 sets a delay time until driving of the parking pawl 113 is started after the P range is selected on the basis of a rotation speed difference between an engine rotation speed and a turbine rotation speed of the torque converter 22 and the oil temperature of the CVT 30 when the selection information indicating that the P range is selected is output. That is, according to the example of the present invention, the delay setter 81 serves as a "delay setter".

More specifically, the delay setter 81 obtains a torque ratio from the rotation speed difference between the engine rotation speed and the turbine rotation speed and the oil temperature of the CVT 30 and sets a delay time in accordance with the torque ratio. First, a method of calculating the torque ratio will be described. For instance, a map in which relations of a rotation speed difference (rpm) between the engine rotation speed and the turbine rotation speed, an oil temperature (° C.), and a torque ratio are defined (torque ratio map) is stored in the ROM of the SBW-CU 80, and the torque ratio is obtained by searching the torque ratio map on the basis of the rotation speed difference and the oil temperature.

Figure 3:
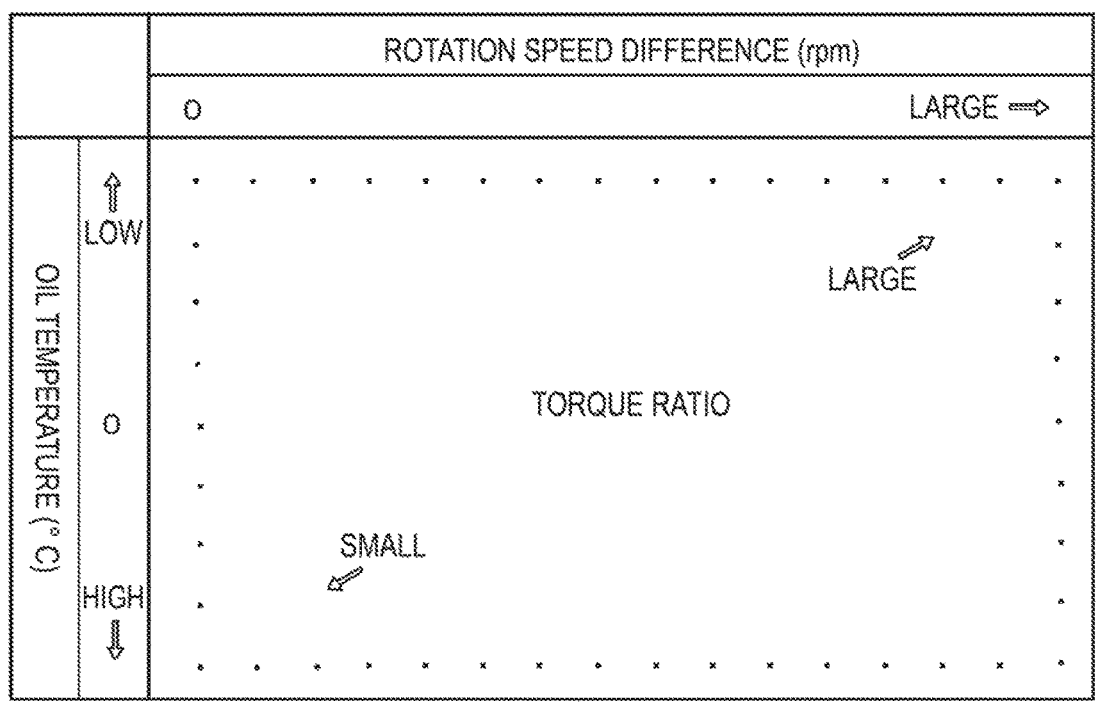
FIG. 3 is a view illustrating an example of a torque ratio map.

An example of the torque ratio map is illustrated in FIG. 3. In FIG. 3, the horizontal axis indicates the rotation speed difference (rpm), and the vertical axis indicates the oil temperature (° C.). In the torque ratio map, a torque ratio is assigned for each combination of the rotation speed difference and the oil temperature (lattice point). In the torque ratio map, the torque ratio is set to increase as the rotation speed difference increases. Also, the torque ratio is set to increase as the oil temperature decreases.

Next, a method of setting a delay time will be described. For instance, a map in which relations between a torque ratio and a delay are defined (delay map) is stored in the ROM of the SBW-CU 80, and a delay time is obtained by searching the delay map on the basis of the torque ratio.

Figure 4:
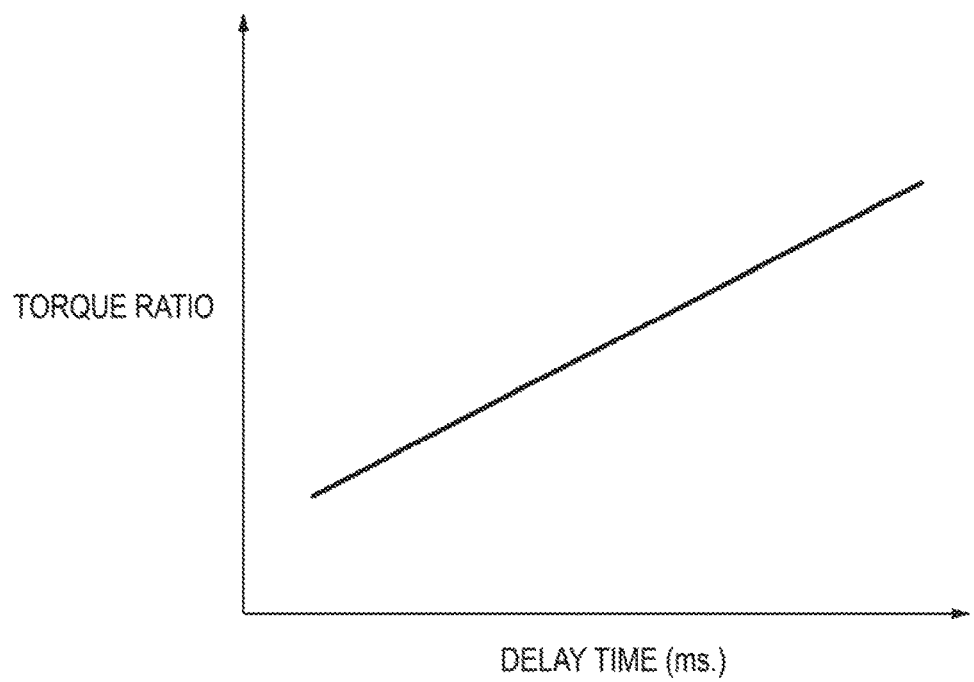
FIG. 4 is a view illustrating an example of a delay map.

An example of the delay map is illustrated in FIG. 4. In FIG. 4, the horizontal axis indicates a delay time (ms), and the vertical axis indicates a torque ratio. In the delay map, a delay time (ms) is assigned for each predetermined torque ratio (lattice point). In the delay map, the delay time is set to be longer as the torque ratio is increased. Also, instead of the above configuration, a map in which relations of the rotation speed difference (rpm), the oil temperature (° C.), and the delay time (ms) are defined may be pre-stored, and the delay time may be obtained by searching the map on the basis of the rotation speed difference and the oil temperature.

Preferably, the delay setter 81 sets a delay time on the basis of the rotation speed difference and the oil temperature at the time of high idling or stalling (e.g., when the shift position is at the D range or the R range, a brake pedal is depressed, and a vehicle is stopped). Therefore, the delay time is set as zero when in neither the high idling state nor the stalling state.

Preferably, the delay setter 81 sets a delay time on the basis of the rotation speed difference and the oil temperature when the oil temperature of the CVT 30 is a predetermined temperature (e.g., 0° C.) or lower (i.e., at a low temperature) and sets a delay time as zero when the oil temperature is higher than the predetermined temperature. Also, the set delay time is output to the range switch controller 82.

When the delay time set by the delay setter 81 has elapsed after the TCU 50 (clutch controller 51) disengages the forward clutch 28 or the reverse brake 29, the range switch controller 82 drives the SBW actuator 85 (the parking pawl 113) and locks the parking gear 114. As a result, the CVT 30 is in the parking state. That is, according to the example of the present invention, the range switch controller 82 serves as a "range switch controller".

Operation of the shift control device 1 will be described with reference to FIG. 5. FIG. 5 is a flowchart illustrating a processing order of a parking lock process (rattling noise reduction control) by the shift control device 1. The process is repeatedly executed at predetermined timings mostly in the TCU 50 and the SBW-CU 80.

In Step S100, whether the P range is selected, i.e., whether the shift lever 55 is switched from the D range to the P range or from the R range to the P range, is determined. When the P range is not selected, the process temporarily stops. On the other hand, when the P range is selected, the process proceeds to Step S102.

In Step S102, whether a high idle state is reached is determined. When the high idle state is not reached, the process temporarily stops. On the other hand, when the high idle state is reached, the process proceeds to Step S104.

In Step S104, whether the oil temperature of the CVT 30 is a predetermined temperature (e.g., 0° C.) or lower (is a low temperature or not) is determined. When the oil temperature is higher than the predetermined temperature, the process temporarily stops. On the other hand, when the oil temperature is the predetermined temperature or lower, the process proceeds to Step S106.

In Step S106, the clutch linear solenoid 60a is driven, the hydraulic pressure supplied to the forward clutch 28 or the reverse brake 29 is decreased, and the forward clutch 28 or the reverse brake 29 is disengaged.

In Step S108, an engine rotation speed and a turbine rotation speed are read. Then, in Step S110, a torque ratio is obtained on the basis of a rotation speed difference between the engine rotation speed and the turbine rotation speed and an oil temperature. Because a method of calculating the torque ratio is the same as that described above, a detailed description thereof will be omitted.

Then, in Step S112, according to the torque ratio obtained in Step S110, a delay time until the parking pawl 113 is driven after the forward clutch 28 or the reverse brake 29 is disengaged is set. Because a method of setting the delay time is the same as that described above, a detailed description thereof will be omitted.

Then, in Step S114, after the forward clutch 28 or the reverse brake 29 is disengaged, whether the delay time set in Step S112 has elapsed is determined. When the delay time has not elapsed, the process is repeatedly executed until the delay time has elapsed. On the other hand, when the delay time has elapsed, twist of the power transmission system is determined as having been released, and the process proceeds to Step S116.

In Step S116, the SBW actuator (parking pawl 113) is driven, the parking pawl 113 and the parking gear 114 are fitted, and the parking gear 114 is locked. That is, the CVT 30 reaches a parked state.

As described in detail above, according to the present example, when a delay time has elapsed after the forward clutch 28 or the reverse brake 29 is disengaged, i.e., when twist of the power transmission system is released, the parking pawl 113 is driven, and the CVT 30 reaches a parked state. Here, the delay time is set on the basis of the rotation speed difference between the engine rotation speed and the turbine rotation speed and the oil temperature of the CVT 30. That is, the delay time may be set in consideration of an operating state of a driving system such as the engine 20 or the torque converter 22 (the magnitude of a torsional torque acting on a drive shaft constituting the power transmission system (amount of twist)). As a result, even when the amount of twist of the drive shaft constituting the power transmission system is changed, the rattling noise (abnormal noise) between the parking gear 114 and the parking pawl 113 generated when the parking gear 114 is locked can be reliably reduced. That is, the rattling noise (abnormal noise) between the parking gear 114 and the parking pawl 113 can be reliably reduced when the parking gear 114 is locked regardless of an operating state of a drive system (the magnitude of a torsional torque acting on the drive shaft constituting the power transmission system) when the parking range is selected.

Particularly, according to the present example, a torque ratio proportional to the magnitude of the torsional torque (amount of twist) of the drive shaft constituting the power transmission system is obtained from the rotation speed difference between the engine rotation speed and the turbine rotation speed and the oil temperature, and a delay time until driving of the parking pawl 113 is started is set from the torque ratio. Consequently, the delay time can be set to an appropriate value according to the magnitude of the torsional torque (amount of twist).

According to the present example, the delay time is set at the time of high idling or stalling. Therefore, at the time of high idling or stalling, that is, by selecting the time when the magnitude of the torsional torque (amount of twist) acting on the drive shaft constituting the power transmission system is particularly large, the rattling noise (abnormal noise) between the parking gear 114 and the parking pawl 113 can be effectively reduced when the parking gear 114 is locked.

According to the present example, the delay time is set when the oil temperature of the CVT 30 is a predetermined temperature (e.g., 0° C.) or lower, and the delay time is set as zero when the oil temperature is higher than the predetermined temperature. Therefore, when the oil temperature of the CVT 30 is a predetermined temperature or lower, that is, by selecting the time when viscosity of oil is higher and the magnitude of the torsional torque (amount of twist) acting on the drive shaft constituting the power transmission system is particularly large, the rattling noise (abnormal noise) between the parking gear 114 and the parking pawl 113 can be effectively reduced when the parking gear 114 is locked.

According to the present example, before the parking pawl 113 is driven, by disengaging the forward clutch 28 (when the D range is switched to the P range) or the reverse brake 29 (when the R range is switched to the P range) constituting the forward-reverse switching mechanism 27, twist of the drive shaft constituting the power transmission system can be released.

Although the example of the present invention has been described above, the present invention is not limited to the example, and may be modified in various ways. For instance, in the above example, the present invention is applied to a chain type CVT. However, instead of the chain type CVT, the present invention may also be applied to, for instance, a belt type CVT or a toroidal type CVT. Also, instead of the CVT, the present invention may also be applied to a stepped automatic transmission (step AT). Further, in the above example, although an AWD vehicle is described as an example, the present invention can also be applied to, for instance, an FF vehicle.

According to an example of the present invention, a rattling noise (abnormal noise) between a parking gear and a parking pawl when the parking gear is locked can be reliably reduced regardless of an operating state of a drive system when a parking range is selected.

The above-described configuration of the driving force transmission system (e.g., disposition of a gear, a shaft, or the like) is an example, and the present invention is not limited thereto. Although the forward-reverse switching mechanism 27 is disposed upstream from the gear shift mechanism 33, the forward-reverse switching mechanism 27 may also be disposed downstream from the gear shift mechanism (variator) 33.

In the example, although the delay setter 81 is disposed in the SBW-CU 80, the delay setter 81 may also be disposed in the TCU 50. In this case, preferably, a delay time is set by the TCU 50, and at the delay time or when the delay time has elapsed, parking lock allowance information is transmitted to the SBW-CU 80.

In the example, the TCU 50, the ECU 70, and the SBW-CU 80 are coupled via the CAN 100 to communicate with each other. However, a system configuration is not limited thereto, and, for instance, may be freely changed in consideration of a functional requirement, the cost, or the like. For instance, the SBW-CU 80 may be integrated with the SBW actuator 85, or the TCU 50 and the SBW-CU 80 may be combined into a single unit.

In addition to the configuration of the example (the configuration in which the forward clutch 28 and the reverse brake 29 are disengaged), a configuration in which the transfer clutch 41 is disengaged may also be adopted. More specifically, for instance, a configuration in which a brake pedal is depressed (a vehicle is braked), the transfer clutch 41 is temporarily disengaged when a speed of the vehicle has become zero and engaged again, the parking pawl 113 is driven, and the parking gear 114 is locked can also be adopted.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A shift control device comprising:
   a selector configured to receive an operation of selecting a shift range of an automatic transmission and output selection information corresponding to the operation, the automatic transmission being configured to convert and output a driving force of an engine input via a torque converter;
   a range switch controller configured to switch the shift range of the automatic transmission in accordance with the selection information output by the selector;
   a parking mechanism that comprises a parking gear and a parking pawl, and that is configured to bring the automatic transmission into a parking state by locking rotation of the automatic transmission through engagement of the parking pawl with the parking gear;
   a clutch disposed between the torque converter and the parking mechanism and configured to turn on/off transmission of the driving force;
   a clutch controller configured to control operation of the clutch in accordance with the selection information output by the selector; and
   a delay setter configured to set a delay time until driving of the parking pawl starts, wherein the delay time is set on the basis of a rotation speed difference between a rotation speed of the engine and a rotation speed of a turbine of the torque converter, and an oil temperature of the automatic transmission when the selection information indicating that a parking range is selected is output,
   wherein the clutch controller disengages the clutch when the selection information indicating that the parking range is selected is output, and
   wherein, when the selection information indicating that the parking range is selected is output, the range switch controller drives the parking pawl and brings the automatic transmission into the parking state when the delay time set by the delay setter has elapsed after the clutch is disengaged by the clutch controller.

2. The shift control device according to claim 1, wherein the delay setter obtains a torque ratio based on the rotation speed difference between the rotation speed of the engine and the rotation speed of the turbine of the torque converter, and the oil temperature of the automatic transmission, and
   wherein the delay setter sets the delay time in accordance with the torque ratio.

3. The shift control device according to claim 2, wherein in a high idling state of the engine, an idle rotation speed of the engine is greater than a threshold idle rotation speed, and
   the delay setter sets the delay time on the basis of the rotation speed difference and the oil temperature at a time of the high idling state and/or stalling.

4. The shift control device according to claim 3, wherein the delay setter sets the delay time on the basis of the rotation speed difference and the oil temperature when the oil temperature of the automatic transmission is a predetermined temperature or lower, and
   the delay setter sets the delay time to zero when the oil temperature is higher than the predetermined temperature.

5. The shift control device according to claim 4, wherein the clutch is disposed between the torque converter and the parking mechanism and is a forward clutch or a reverse brake constituting a forward-reverse switching mechanism configured to switch a normal rotation and a reverse rotation of a driving wheel.

6. The shift control device according to claim 3, wherein the clutch is disposed between the torque converter and the parking mechanism and is a forward clutch or a reverse brake constituting a forward-reverse switching mechanism configured to switch a normal rotation and a reverse rotation of a driving wheel.

7. The shift control device according to claim 2, wherein the delay setter sets the delay time on the basis of the rotation speed difference and the oil temperature when the oil temperature of the automatic transmission is a predetermined temperature or lower, an
   the delay setter sets the delay time to zero when the oil temperature is higher than the predetermined temperature.

8. The shift control device according to claim 7, wherein the clutch is disposed between the torque converter and the parking mechanism and is a forward clutch or a reverse brake constituting a forward-reverse switching mechanism configured to switch a normal rotation and a reverse rotation of a driving wheel.

9. The shift control device according to claim 2, wherein the clutch is disposed between the torque converter and the parking mechanism and is a forward clutch or a reverse brake constituting a forward-reverse switching mechanism configured to switch a normal rotation and a reverse rotation of a driving wheel.

10. The shift control device according to claim 1, wherein in a high idling state of the engine, an idle rotation speed of the engine is greater than a threshold idle rotation speed, and
    the delay setter sets the delay time on the basis of the rotation speed difference and the oil temperature at a time of the high idling state and/or stalling.

11. The shift control device according to claim 10, wherein
    the delay setter sets the delay time on the basis of the rotation speed difference and the oil temperature when the oil temperature of the automatic transmission is a predetermined temperature or lower, and
    the delay setter sets the delay time to zero when the oil temperature is higher than the predetermined temperature.

12. The shift control device according to claim 11, wherein
    the clutch is disposed between the torque converter and the parking mechanism and is a forward clutch or a reverse brake constituting a forward-reverse switching mechanism configured to switch a normal rotation and a reverse rotation of a driving wheel.

13. The shift control device according to claim 10, wherein
    the clutch is disposed between the torque converter and the parking mechanism and is a forward clutch or a reverse brake constituting a forward-reverse switching mechanism configured to switch a normal rotation and a reverse rotation of a driving wheel.

14. The shift control device according to claim 1, wherein
the delay setter sets the delay time on the basis of the rotation speed difference and the oil temperature when the oil temperature of the automatic transmission is a predetermined temperature or lower, and
the delay setter sets the delay time to zero when the oil temperature is higher than the predetermined temperature.

15. The shift control device according to claim 14, wherein
the clutch is disposed between the torque converter and the parking mechanism and is a forward clutch or a reverse brake constituting a forward-reverse switching mechanism configured to switch a normal rotation and a reverse rotation of a driving wheel.

16. The shift control device according to claim 1, wherein
the clutch is disposed between the torque converter and the parking mechanism and is a forward clutch or a reverse brake constituting a forward-reverse switching mechanism configured to switch a normal rotation and a reverse rotation of a driving wheel.

\* \* \* \* \*